US012691480B2

(12) United States Patent
Mantel

(10) Patent No.: US 12,691,480 B2
(45) Date of Patent: Jul. 28, 2026

(54) CLEANER

(71) Applicant: GEA Tuchenhagen GmbH, Büchen (DE)

(72) Inventor: Hendrik Mantel, Neuenkirchen (DE)

(73) Assignee: GEA Tuchenhagen GmbH, Büchen (DE)

( * ) Notice: Subject to any disclaimer, the term of this patent is extended or adjusted under 35 U.S.C. 154(b) by 66 days.

(21) Appl. No.: 18/722,694

(22) PCT Filed: Dec. 14, 2022

(86) PCT No.: PCT/EP2022/085792
§ 371 (c)(1),
(2) Date: Jun. 21, 2024

(87) PCT Pub. No.: WO2023/117615
PCT Pub. Date: Jun. 29, 2023

(65) Prior Publication Data

US 2025/0058364 A1 Feb. 20, 2025

(30) Foreign Application Priority Data

Dec. 23, 2021 (DE) ..................... 10 2021 006 330.9

(51) Int. Cl.
*B08B 9/093* (2006.01)

(52) U.S. Cl.
CPC ........ *B08B 9/0936* (2013.01); *B08B 2209/08* (2013.01)

(58) Field of Classification Search
CPC .......................... B08B 9/0936; B08B 2209/08
USPC ..................................................... 134/167 R
See application file for complete search history.

(56) References Cited

U.S. PATENT DOCUMENTS

2017/0348722 A1* 12/2017 Jensen .................. B05B 15/555

FOREIGN PATENT DOCUMENTS

DE 3617783 A1 12/1987
EP 0247532 A2 * 12/1987 ........... B05B 3/0444
EP 3037175 A1 6/2016

OTHER PUBLICATIONS

EP0247532A2—machine translation (Year: 1987).*
International Search Report and Written Opinion from PCT/EP2022/085792 dated Apr. 12, 2023.

* cited by examiner

*Primary Examiner* — Tinsae B Ayalew
(74) *Attorney, Agent, or Firm* — Calfee, Halter & Griswold LLP

(57) ABSTRACT

The invention relates to a cleaner comprising a base member connectable to a conduit for a cleaning agent, a head rotatably mounted about a first axis on the base member and a nozzle head mounted rotatably about a second axis on the head and having at least one nozzle. According to the invention, the nozzle head has an auxiliary nozzle which forms a cleaning jet and directs it toward the head, or an auxiliary nozzle which forms a cleaning jet and directs it toward the head is arranged on the nozzle head.

20 Claims, 2 Drawing Sheets

CLEANER

Figure 1:
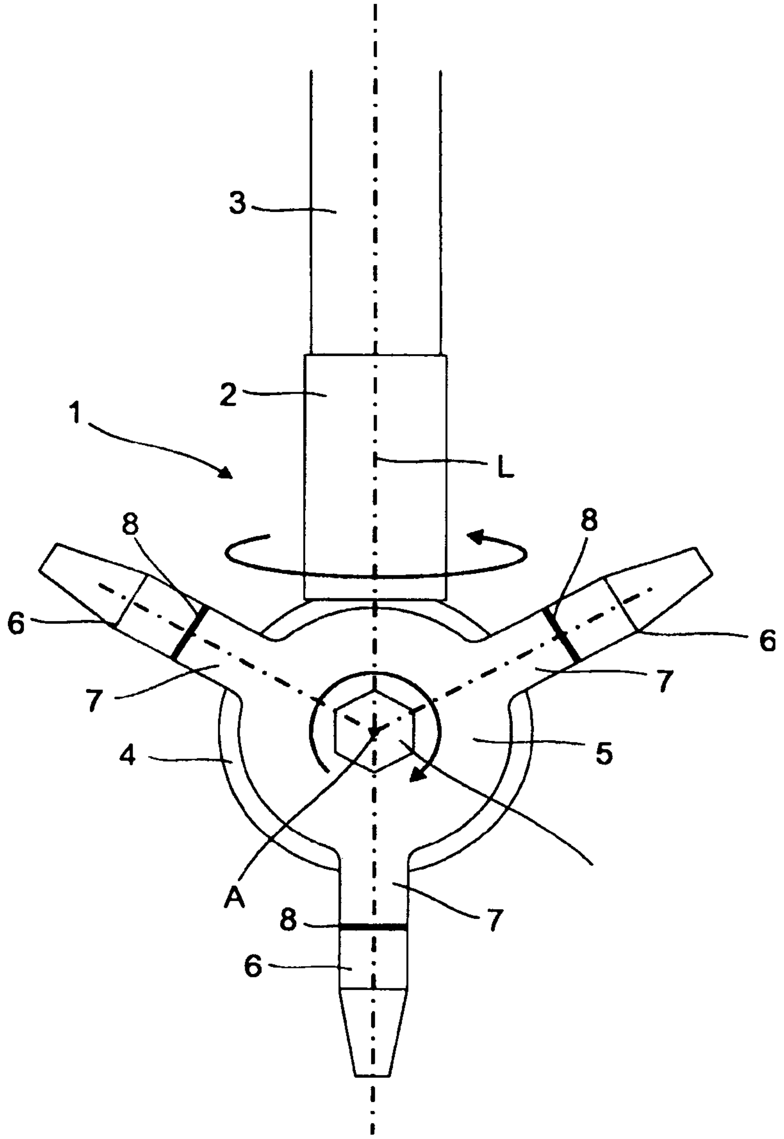

This application is the U.S. national stage entry of PCT/EP2022/085792, filed on Dec. 14, 2022, which claims priority to DE Patent Application No. 10 2021 006 330.9, filed on Dec. 23, 2021, the entire disclosures of which are fully incorporated herein by reference.

The invention relates to a cleaner according to the preamble of the first claim.

Cleaners of the kind involved here are used in production facilities for food, beverages, medicines and fine chemicals, and in biotechnology, in particular for cleaning the interior of containers and tanks.

A generic cleaner comprises a base member, a head and a nozzle head.

The base member is connectable to a conduit that projects into the tank and which is designed to convey a cleaning agent, which in most cases is a liquid. The base member receives the cleaning agent.

A head which is rotatable about a first axis is mounted on the base member. The cleaning agent is received by the head and passed on to a nozzle head.

The nozzle head is mounted rotatably about a second axis on the head and receives the cleaning agent from the latter. The cleaning agent is then expelled in a cleaning jet through at least one nozzle and is sprayed onto the surface to be cleaned.

The first axis and the second axis are preferably at an angle to each other, often at a right angle, for example. Due to this arrangement at an angle and to the rotation about the two axes, it is possible for as large a part of the inner surface of the tank or container as possible to be cleaned.

Even stronger cleaning is achieved by 'self-cleaning', the aim of which is to wet the surface of the cleaner itself with a cleaning agent in order to get and/or keep it free of dirt.

Modifying the nozzle head so as to bring cleaning agent onto the surface of the cleaner is known from the prior art. There are two different basic concepts that are commonly used for this modification.

The first concept involves providing the nozzle head with an outlet from which a jet of cleaning agent is aimed at the base member. The cleaning agent hits the base member as far away as possible in the direction of the conduit, then runs off over the base member and the head. This is proposed in EP 3037175 B1, for example.

The second concept, in contrast, uses at least one opening on the nozzle head close to the head, from which opening a surge of cleaning agent is discharged. This surge then flows along the surface of the head. Examples in the patent literature are shown in EP 0560778 B1 and EP 1807215 B1.

The object of the invention was therefore to present a cleaner with improved self-cleaning.

This object is achieved by a cleaner having the features of the first claim. The dependent claims are advantageous developments of the cleaner.

The cleaner has a base member connectable to a conduit for a cleaning agent and also comprises a head which is rotatably mounted about a first axis on the base member, as well as a nozzle head which is mounted rotatably about a second axis on the head and has at least one nozzle. The angle between the first axis and the second axis may be approximately 70 to 100 degrees, and may in particular be a right angle. An auxiliary nozzle arranged on the nozzle head is now provided in addition. The cleaning head includes the auxiliary nozzle, or the auxiliary nozzle is arranged on it. The auxiliary nozzle is designed to form a cleaning jet and to direct the cleaning jet toward the head. It should be understood that the cleaning nozzle is arranged and designed accordingly to form the cleaning jet and to direct it straight at the head. The cleaning of the head is significantly improved in this manner, in contrast to the prior art. Whereas in the concepts mentioned above the cleaning agent runs off over the head, the claimed solution utilizes the effect of a jet of cleaning agent hitting the surface of the head. The auxiliary nozzle is preferably configured to form the cleaning jet in such a way that the cleaning jet moves in a direction having at least one component of movement that is orthogonal to the surface of the head. The impact of the cleaning agent significantly intensifies the cleaning of the surface.

The design of the auxiliary nozzle relates to the way in which the cleaning agent is conducted, for example to the shape given to a channel inside the auxiliary nozzle, through which the cleaning agent flows and is expelled from its end. The channel cross-section, the channel length and the discharge angle relative to the second axis must be chosen with a view to the result achieved. Consideration must also be given to the pressure the cleaning agent is under. The channel may also have constrictions in some sections. A bore is a simple and cost-efficient way of providing the channel. The auxiliary nozzle is arranged on the nozzle head, so it can also be provided on the nozzle itself.

In a development of the invention, the auxiliary nozzle is arranged on the nozzle head and is designed to direct the cleaning jet to hit a base of the head, which is arranged on a side of the head facing away from the base member. This improves self-cleaning even more, and the base in particular benefits from the impact of a jet.

This development of the invention is particularly easy to implement if the auxiliary nozzle is arranged at a greater distance from the second axis than the base.

In another embodiment, the outlet of the auxiliary nozzle is arranged flush with a surface of the nozzle head, on which surface the outlet is located. This prevents unnecessary edges, steps and shoulders, thus providing a further increase in cleanability.

This embodiment is further improved if the surface is planar.

A development that is easy to manufacture and provides the correct result in terms of jet pattern is one in which the auxiliary nozzle includes a bore in the nozzle head.

Another advantage is achieved by arranging the auxiliary nozzle on a nozzle receiver. In comparison with the kind of nozzle that is designed in many cases to be removable, arranging the auxiliary nozzle on the nozzle receiver means that the orientation of the jet is reliably set in the factory when the nozzle head is manufactured, and cannot become maladjusted as a result of maintenance or operation. This ensures good self-cleaning on a long-term basis with the aid of the auxiliary nozzle.

This embodiment is further improved if an outlet subchannel is arranged between an interior space of the nozzle head and the auxiliary nozzle. By providing such an outlet subchannel, the auxiliary nozzle is supplied with cleaning agent directly from the interior space. The outlet subchannel can be manufactured cost-efficiently by drilling a bore. If the outlet subchannel has another end in addition to the auxiliary nozzle, this can be closed by welding, for example.

When an outlet subchannel is provided, it is advantageous if the auxiliary nozzle branches off from the outlet subchannel and an end of the outlet subchannel is closed by a seal between the nozzle and the nozzle receiver. The seal then seals the gap between the nozzle and the nozzle receiver and seals the outlet subchannel against that gap. This prevents dirt from entering the gap. It also prevents cleaning agent from leaking out through the gap and no longer being available for the cleaning jet. The seal also has the advantage that the outlet subchannel can be accessed by removing the seal for cleaning when maintenance work is carried out.

If a outlet subchannel is provided, it is advantageous if a separating member separates the outlet subchannel and a channel arranged in the nozzle from one another. By this means, the streams of cleaning agent through the nozzle and the auxiliary nozzle are independent of each other from the interior space onwards. This simplifies the design and prevents undesirable flow effects during operation.

Figure 2:
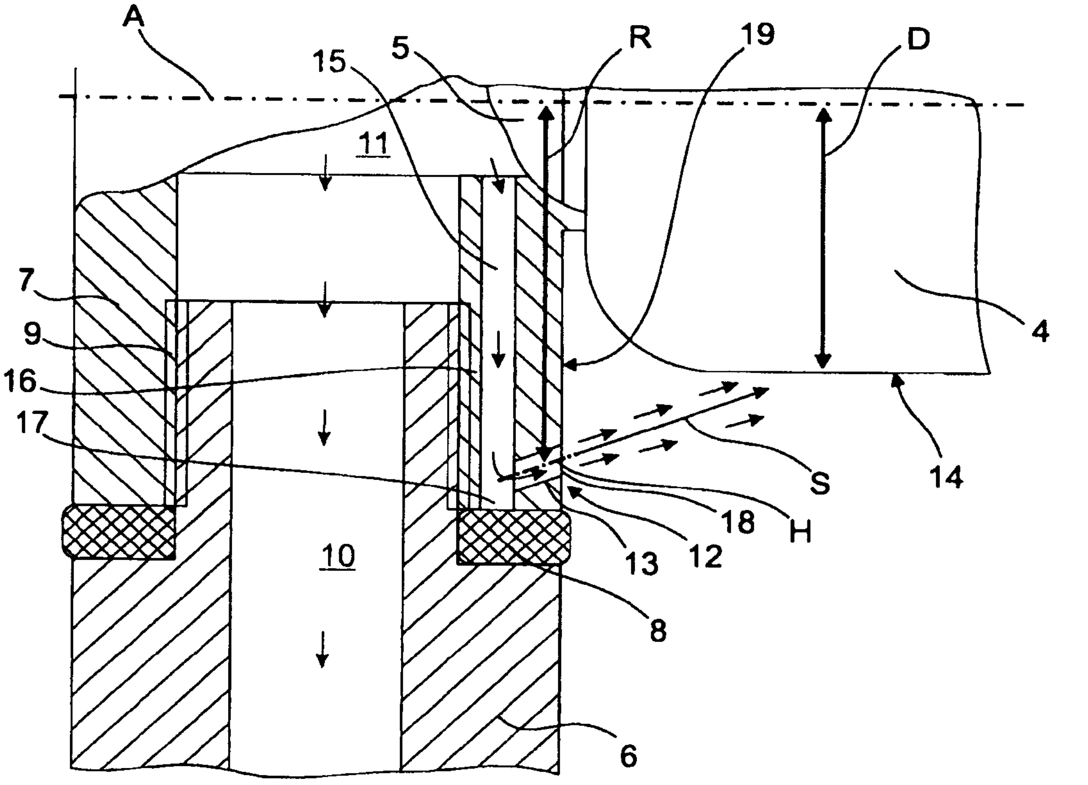

The invention shall now be described with reference to an embodiment, and the description of its advantages shall be described in greater depth. In the Figures, FIG. 1: shows a view of a cleaner having a base member, a head and a nozzle head;

FIG. 2: shows a cutaway view of a detail of the head and the nozzle head.

FIG. 1 shows a view of a cleaner 1.

Cleaner 1 has a base member 2 that is connected to a conduit 3. Conduit 3 conducts a cleaning agent, generally a liquid, and protrudes together with cleaner 1 into a vessel to be cleaned. The connection between base member 2 and conduit 3 may be releasable, for example by means of a screw connection. Clamps or welds are also known from the prior art.

Base member 2 defines a first axis L along which it can extend. The first axis L may coincide with a direction in which conduit 3 extends.

A head 4 is mounted rotatably about the first axis L on base member 2. Rotation is produced by a drive means as known from the prior art. The drive means may comprise a stationary guide vane wheel and a rotatably movable vane wheel. The movable vane wheel is operatively connected to the head. The stationary guide vane wheel and the movable vane wheel are arranged so that cleaning agent can flow through them. The cleaning agent flowing through causes the movable vane wheel to rotate, and the rotation is then transferred to the head.

A nozzle head 5 is mounted rotatably about a second axis A on head 4. The second axis A is at an angle to the first axis L and is often chosen to be a right angle. However, it may also differ from a right angle by a few dozen degrees.

The nozzle head has at least one nozzle 6, from which the cleaning agent entering cleaner 1 via conduit 3 is discharged from cleaner 1. Nozzle 6 is shaped to form a jet, so that the cleaning agent has a cleaning effect when it hits an inner wall of a vessel, even in vessels that are some metres in diameter, and so that it also removes dirt kinetically from the inner wall.

A plurality of nozzles 6 may be arranged on nozzle head 5 in the circumferential direction around the second axis A. The number and design of the nozzles 6 is generally adapted to the size of the vessel and to the amount and pressure of the cleaning agent, whereby nozzles 6 of different designs may also be arranged on the nozzle head 5 of a cleaner 1.

Nozzle 6 is fastened in a nozzle receiver 7. Its fastening may be releasable so that nozzle 6 can be changed. A seal 8 that seals a gap between the components is provided between nozzle 6 and nozzle receiver 7. This prevents dirt from being deposited there and any inadvertent escape of cleaning fluid that would mean a reduced effectiveness of nozzle 6. Nozzle receiver 7 is designed as a socket that protrudes from nozzle head 5 in a radial direction relative to the second axis A.

FIG. 2 shows a partial view of head 4 and nozzle head 5. Nozzle head 5 is seen in a partial section view.

Nozzle 6 is connected to nozzle receiver 7. Nozzles 6 and nozzle receivers 7 are advantageously simple and reliable in design with matching threads that allow a screw connection 9 to be produced. Through nozzle 6 there extends a channel 10 through which pressurised cleaning agent flows from an interior space 11 of nozzle head 5 before exiting nozzle 6.

The nozzle head has an auxiliary nozzle 12 through which an auxiliary nozzle channel 13 extends. Auxiliary nozzle 12 is in fluid communication with an interior space 11. Cleaning agent under pressure in interior space 11 flows through auxiliary nozzle channel 13 and is expelled from auxiliary nozzle 12.

Auxiliary nozzle 12 is designed in such a way that the discharged cleaning agent is formed into a jet and that the jet is directed toward head 4. The design is defined by the diameter and length of auxiliary nozzle channel 13, and also by whether and in what form auxiliary nozzle channel 13 tapers along the flow path. In conjunction with the pressure of the cleaning agent, this results in a form of jet that may also fan out. The design is specified, for example, for a particular cleaning agent pressure for the intended use and for a particular distance between auxiliary nozzle 12 and head 4. It is necessary in this regard to take into account how strong the impact of the cleaning agent is to be and to what extent fanning out is necessary to achieve the desired cleaning pattern on head 4.

A jet spraying direction S is determined, in particular, by the extent to which a longitudinal axis H of auxiliary nozzle channel 13 is inclined toward the second axis A when viewed in the spraying direction.

The inclination of longitudinal axis H, a distance R from auxiliary nozzle 12 to the second axis A, and the rotation about the second axis A all result in a spray cone. The inclination and distance R are selected so that the spray cone and head 4 intersect geometrically, such that head 4 is hit at least temporarily by a jet of cleaning agent when auxiliary nozzle 12 rotates about the second axis A. During such rotation, head 4 is preferably hit to a predominant extent, or even better all the time, in order to improve the result of cleaning.

On a side facing away from the supply line, head 4 has a base 14 that is spaced a distance D away from the second axis A. When cleaner 1 is in operation, base 14 is generally located at the bottom of head 4 in relation to the direction of gravity. The base may be planar in design or dome-shaped. If it is dome-shaped, D denotes the maximum distance between the base and the second axis A.

The embodiment shows the advantageous design in which the distance R of auxiliary nozzle 12 from the second axis is selected to be greater than the distance D of base 14 from the second axis. As a result, the jet of cleaning agent hits base 14 and cleans it while auxiliary nozzle 12 is rotating about the second axis A. If necessary, the inclination of auxiliary nozzle 12 relative to the second axis A is adjusted to direct the cleaning agent jet onto base 14.

Auxiliary nozzle 12 is provided on nozzle receiver 7. This provides advantages, for example in comparison with an arrangement on nozzle 6, in that the orientation of auxiliary nozzle 12 on nozzle receiver 7 is fixed and does not depend on the installed condition of nozzle 6. In the case of a screw connection, nozzle 6 can be skewed relative to the target state, for example by not tightening the screw connection sufficiently. If that happens, auxiliary nozzle 12 is also misaligned.

The cleaning agent is fed from interior space 11 to the auxiliary nozzle channel 13 of auxiliary nozzle 12 with the aid of an outlet subchannel 15. This outlet subchannel 15 passes through nozzle receiver 7 and is arranged next to channel 10 and can be provided in the form of a parallel bore to channel 10, for example.

Outlet subchannel 15 and channel 10 are separated from each other by a separating member 16. By this means, nozzle 6 and auxiliary nozzle 12 take cleaning agent from interior space 11 without the flows of cleaning agent being dependent on each other. This is advantageous in terms of flow mechanics and also provides a way of introducing a flow-modulating means, for example a guide surface, into channel 10.

Outlet subchannel 15 has an end 17 before which auxiliary nozzle channel 13 branches off in the direction of flow. End 17 is sealed, for example by a sealing weld. However, the embodiment shown, in which the closure is achieved by means of the seal 8 that is already present, is more advantageous. This is constructionally simple, reliable in terms of assembly and allows outlet subchannel 15 to be accessed for cleaning when maintenance work is carried out on the cleaner. In this case, outlet subchannel 15 may be provided in the form of a bore that is placed on the seat surface of seal 8 on the side of nozzle receiver 7.

An outlet 18 of auxiliary nozzle 12 may be flush with an area 19 of nozzle head 5. In the case shown here, area 19 is located on nozzle receiver 7, which in this section is planar. This avoids any edges or steps, prevents any deposits of dirt and makes it easier to clean area 19.

LIST OF REFERENCE SIGNS

1 Cleaner
2 Base member
3 Conduit
4 Head
5 Nozzle head
6 Nozzle
7 Nozzle receiver
8 Seal
9 Screw connection
10 Channel
11 Interior space
12 Auxiliary nozzle
13 Auxiliary nozzle channel
14 Base
15 Outlet subchannel
16 Separating member
17 End of the outlet subchannel
18 Outlet of the auxiliary nozzle
19 Surface
L First axis
A Second axis
R Distance between the auxiliary nozzle and the second axis
D Distance between the base and the second axis
S Jet spraying direction
H Longitudinal axis of the auxiliary nozzle

The invention claimed is:

1. A cleaner comprising a base member connectable to a conduit for a cleaning agent, a head mounted rotatably about a first axis on the base member, a nozzle head mounted rotatably about a second axis on the head having a nozzle, and an auxiliary nozzle forming a cleaning jet directed toward the head, wherein the nozzle head includes the auxiliary nozzle or the auxiliary nozzle is arranged on the nozzle head;

wherein the auxiliary nozzle is arranged on the nozzle head and is configured to direct the cleaning jet to hit a base of the head, the base of the head being a bottommost portion of the head and being arranged on a side of the head facing away from the base member.

2. The cleaner according to claim 1, wherein the auxiliary nozzle is arranged at a greater distance from the second axis than the base of the head.

3. The cleaner according to claim 1, wherein an outlet of the auxiliary nozzle is arranged flush with a surface of the nozzle head.

4. The cleaner according to claim 3, wherein the surface of the nozzle head is planar.

5. The cleaner according to claim 1, wherein the auxiliary nozzle includes a bore in the nozzle head.

6. The cleaner according to claim 1, wherein the auxiliary nozzle is arranged on a nozzle receiver.

7. The cleaner according to claim 6, wherein an outlet subchannel is arranged between an interior space of the nozzle head and the auxiliary nozzle.

8. The cleaner according to claim 7, wherein the auxiliary nozzle branches off from the outlet subchannel and an end of the outlet subchannel is closed by a seal arranged between the nozzle and the nozzle receiver.

9. The cleaner according to claim 7, wherein a separating member separates the outlet subchannel and a channel arranged in the nozzle from one another.

10. The cleaner according to claim 1, wherein the auxiliary nozzle is configured such that the cleaning jet may move in a direction having at least one component of movement that is orthogonal to a surface of the head.

11. The cleaner according to claim 1, wherein an outlet of the auxiliary nozzle is arranged flush with a surface of the nozzle head.

12. The cleaner according to claim 1, wherein the auxiliary nozzle includes a bore in the nozzle head.

13. The cleaner according to claim 1, wherein the auxiliary nozzle is arranged on a nozzle receiver.

14. The cleaner according to claim 1, wherein the auxiliary nozzle is configured such that the cleaning jet may move in a direction having at least one component of movement that is orthogonal to a surface of the head.

15. The cleaner according to claim 3, wherein the auxiliary nozzle is configured such that the cleaning jet may move in a direction having at least one component of movement that is orthogonal to the surface of the head.

16. The cleaner according to claim 4, wherein the auxiliary nozzle includes a bore in the nozzle head.

17. The cleaner according to claim 5, wherein the auxiliary nozzle is arranged on a nozzle receiver.

18. The cleaner according to claim 8, wherein a separating member separates the outlet subchannel and a channel arranged in the nozzle from one another.

19. The cleaner according to claim 18, wherein the auxiliary nozzle is configured such that the cleaning jet may move in a direction having at least one component of movement that is orthogonal to the surface of the head.

20. The cleaner according to claim 1, wherein the base of the head is flat.

* * * * *